United States Patent
Linderholm

[11] Patent Number: 5,971,678
[45] Date of Patent: Oct. 26, 1999

[54] SPINDLE UNIT

[75] Inventor: Dag G. Linderholm, Rönninge, Sweden

[73] Assignee: Novator AB, Stockholm, Sweden

[21] Appl. No.: 09/092,467

[22] Filed: Jun. 5, 1998

[51] Int. Cl.⁶ .................................................. B23C 1/30
[52] U.S. Cl. .............................. 409/132; 82/1.2; 408/150
[58] Field of Search ........................ 82/1.2, 1.4; 408/88, 408/150, 151, 237; 409/132, 143, 200

[56] References Cited

U.S. PATENT DOCUMENTS

| | | | |
|---|---|---|---|
| 3,700,345 | 10/1972 | Schubert | 408/150 |
| 4,043,700 | 8/1977 | Singer | 408/88 |
| 4,569,115 | 2/1986 | Unno et al. | 82/1.4 |
| 4,884,481 | 12/1989 | Strauss | 82/1.2 |
| 5,030,042 | 7/1991 | Haga et al. | 408/150 |
| 5,197,836 | 3/1993 | Crivellin | 409/200 |
| 5,226,763 | 7/1993 | Lind | 409/143 |
| 5,482,415 | 1/1996 | Belaga et al. | 409/200 |

FOREIGN PATENT DOCUMENTS 3073203  3/1991  Japan ........................... 82/1.2

*Primary Examiner*—Andrea L. Pitts
*Assistant Examiner*—Adesh Bhargava
*Attorney, Agent, or Firm*—Taylor & Associates, P.C.

[57] ABSTRACT

An apparatus for machining a hole in a work piece includes a spindle motor that is rotatable about a principal axis. The spindle motor includes a tool holder having a tool axis substantially parallel to the principal axis. The tool holder is rotatable about the tool axis. An axial actuator is configured for moving the spindle motor in an axial feed direction substantially parallel to each of the principal axis and the tool axis. A radial actuator is configured for adjusting a radial distance between the principal axis and the tool axis.

16 Claims, 8 Drawing Sheets

SPINDLE UNIT

BACKGROUND OF THE INVENTION

1. Field of the Invention

The present invention relates to a method and spindle unit for producing a hole or a recess in a work piece which may include flat or curved sheets of fiber-reinforced composite material, metal or combinations thereof.

2. Description of the Related Art

Structures for aerospace and other applications are often made up of thin curved shells of different material such as aluminum, titanium, stainless steel and fiber-reinforced composite materials. In structural applications different components are often fastened by use of bolted joints. Bolt holes for aerospace structures are typically about 4–20 mm diameter with high quality requirements to secure the integrity of the structure.

Hole requirements are related to dimension and damage. Dimension requirements include, for example, cylindrical hole diameter, height of the cylindrical part of the hole, diameter and angle of countersinks, roundness, and alignment with the normal direction of the surface. Damage related requirements include, among other things, allowable burr height, surface finish and, with regard to fiber-reinforced composites, allowable delamination.

Particular problems occur when drilling holes in fiber-reinforced composites. Polymer composite materials have been generally known since the 1950's. These materials are composed of a protective and binding polymer, either a thermoplastic or a thermosetting plastic, usually referred to as the matrix, together with fibers (e.g. glass, carbon or amide fibers), which may be regarded as a reinforcing material. The fibers may be continuous and oriented in specific directions, or they may be relatively short and arranged at random in the matrix. Composites with continuous and oriented fibers give products with mechanical properties superior to those of conventional polymer and metallic materials, especially as far as their weight-related strength and stiffness are concerned. Composites with shorter fibers find an application where rather less demanding properties are called for. One factor obstructing the wider use of composite materials is the absence of effective methods of cutting machining. The physical and chemical properties of the composite materials mean that known machining methods cannot generally be applied with successful results.

Products consisting of composite material often contain holes for various purposes. These holes may be required, for instance, to permit the laying of service lines, assembly or inspection. Bolt holes are a particularly important category of hole. Structures for practical applications are often constructed from components joined together to produce a finished product. The purpose of the joint is to transfer the load from one structural element to another. One common form of joining is the bolted connection, in which the load is transferred by either shearing loads or tensile loads in the bolt. The strength of a bolted connection is influenced to a considerable degree by the quality and precision of the hole. Reference may be made to three particular problem areas when producing holes in polymer based fiber reinforced composite materials:

1. Low interlaminar strength. When machining laminated composite materials, there is a risk of the layers separating (delaminating) because of the low interlaminar strength. Extensive delamination damage can jeopardize the strength of the laminate.

2. Low resistance to heat and cold of certain thermoplastics. The heat generated during machining can cause the matrix to soften and block the tool, making further machining impossible. In order to achieve good hole quality, it is accordingly necessary to provide effective cooling of the tool/hole edge, and for the material removed by cutting (chips, splinters and grinding dust) to be removed continuously from the hole.

3. High wear resistance of fibers. The cutting machining of the fiber composites causes severe wear of the tool because of the good wear characteristics of the fiber materials. This leads to high wear costs, especially when producing holes with a requirement for high precision.

The methods used to produce holes in composite laminates are traditional drilling, boring, milling, sawing and grinding. The problem associated with these hole-forming methods as they are applied at the present time is that they are not sufficiently effective for various reasons from a technical/economic point of view.

High wear costs are a general problem associated with cutting machining where high precision is required. Great care must be taken when drilling or boring to ensure that delamination damage is avoided on both the entry and exit sides. Special cutters are required in order to achieve the stipulated hole quality, and special procedures must be formulated. In order to avoid extensive delamination damage on the exit side of the laminate, local lateral pressure must be applied around the edge of the hole. Another previously disclosed method of protecting the exit side from damage is to provide the laminate with an additional protective layer.

Sawing is a distinctly unsuitable method for producing holes with high precision requirements. When producing holes by grinding, use is made of a cylindrically shaped tubular body, the machining end of which is coated with a wear-resistant surface layer. Holes are produced by grinding the surface of the material transversely while first causing the grinding body to rotate. The method is slow and gives low precision.

It should be pointed out in this respect that hole-machining methods, in which a body driven rotatably about an axis of rotation is also caused to execute an orbital motion (i.e., the axis of rotation is displaced in such a way that the side is able to move relative to the edge of the hole), are generally familiar. SE 173 899 discloses a machine tool having a tool carrier rotating eccentrically about a principal axis, in which the distance between the tool carrier and the principal axis is determined by a guide component, which rotates about the principal axis together with the tool carrier. The guide component rotating together with the tool carrier is arranged perpendicular to the principal axis and is executed as a cam capable of rotating about it in relation to the tool holder, with the guiding profile of which cam the tool holder is in direct engagement. The advantages of this invention include, among other things, the absence of free play and the space-saving execution of the guide component. However, the offset between the axis of rotation of the tool holder and the eccentric axis of rotation is fixed and determined by the size of the cam gear. Thus, the offset cannot be easily adjusted without replacing the cam gear within the head. SE 382 506 discloses a rotatably driven, combined cutting tool for making holes in stationary work pieces, which holes can be provided with a conical starting chamfer.

Disclosed in the U.S. Pat. No. 5,641,252 (Eriksson et al.), is a method for machining holes in a fiber-reinforced composite material which presents a significant step forward in the art. The central axis of the hole passes through a predetermined point on the surface of the work piece and is oriented in a certain direction in relation to the longitudinal directions of the fibers in the immediate vicinity of the point. The material is machined simultaneously in both an axial and a radial sense by causing the tool to describe axial motion and rotate not only about its own axis, but also eccentrically about the central axis. This method makes it possible to machine holes without causing delamination in the composite material.

Aerospace and related structures are typically made up of different materials stacked together. Particular problems occur when co-drilling structures including several layers of different materials (material stacks). Such problems include burrs in between the layers, close up holes, and damage in filler material in between layers (liquid shims). Drilling holes using traditional techniques generates heat which may cause rapid wear of the tool. This problem is particularly pronounced when drilling holes in titanium.

It is also known to mount a traditional spindle on a robot arm and to use the control system of the robot to dictate the movements of the cutting tool. A problem is that the precision and quality of the resulting hole is limited by the mechanics of the robot and its associated control system, which are designed for moving and positioning a heavy robot arm. Thus, the precision and performance of the robot mechanics and control system are not sufficient to machine, for example, high precision fastener holes at high speeds using the required motion.

SUMMARY OF THE INVENTION

The present invention eliminates the shortcomings and limitations associated with previously disclosed methods and permits the rational and cost-effective production of holes, free from strength-reducing damage and burrs, and, in so doing, guarantees repeatably good hole quality. The present invention provides a spindle unit for cutting a hole in a work piece having a cutting tool with a first axis of rotation, wherein the cutting tool is also movable about a second, eccentric axis of rotation which is adjustable using a mechanical drive element. The spindle unit can be mounted on a robot arm which is used to position and orient the end effector, with the precise machining being controlled by the spindle unit.

The invention comprises, in one form thereof, an apparatus for machining a hole in a work piece including a spindle motor that is rotatable about a principal axis. The spindle motor includes a tool holder having a tool axis substantially parallel to the principal axis. The tool holder is rotatable about the tool axis. An axial actuator is configured for moving the spindle motor in an axial feed direction substantially parallel to each of the principal axis and the tool axis. A radial actuator is configured for adjusting a radial distance between the principal axis and the tool axis.

The eccentric rotary motion is a strictly rotary motion, i.e., it is executed with a constant or continuously varying distance between the central axis and the axis of rotation of the tool.

The apparatus exhibits a number of substantial advantages compared with generally familiar machines:
1. The apparatus allows the radial offset between the axis of rotation of the cutting tool and the eccentric axis of rotation to be easily adjusted without the replacement of any parts.
2. The apparatus enables the production of holes of higher precision and quality than can be achieved by using the control system of a robot arm.
3. The method permits the production of holes to tight tolerances. The dimensional accuracy of the hole is determined substantially by the accuracy of positioning the tool relative to a central axis. The requirements imposed on the geometry of the tool are not particularly high, on the other hand, since every individual tool is simply calibrated before use.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
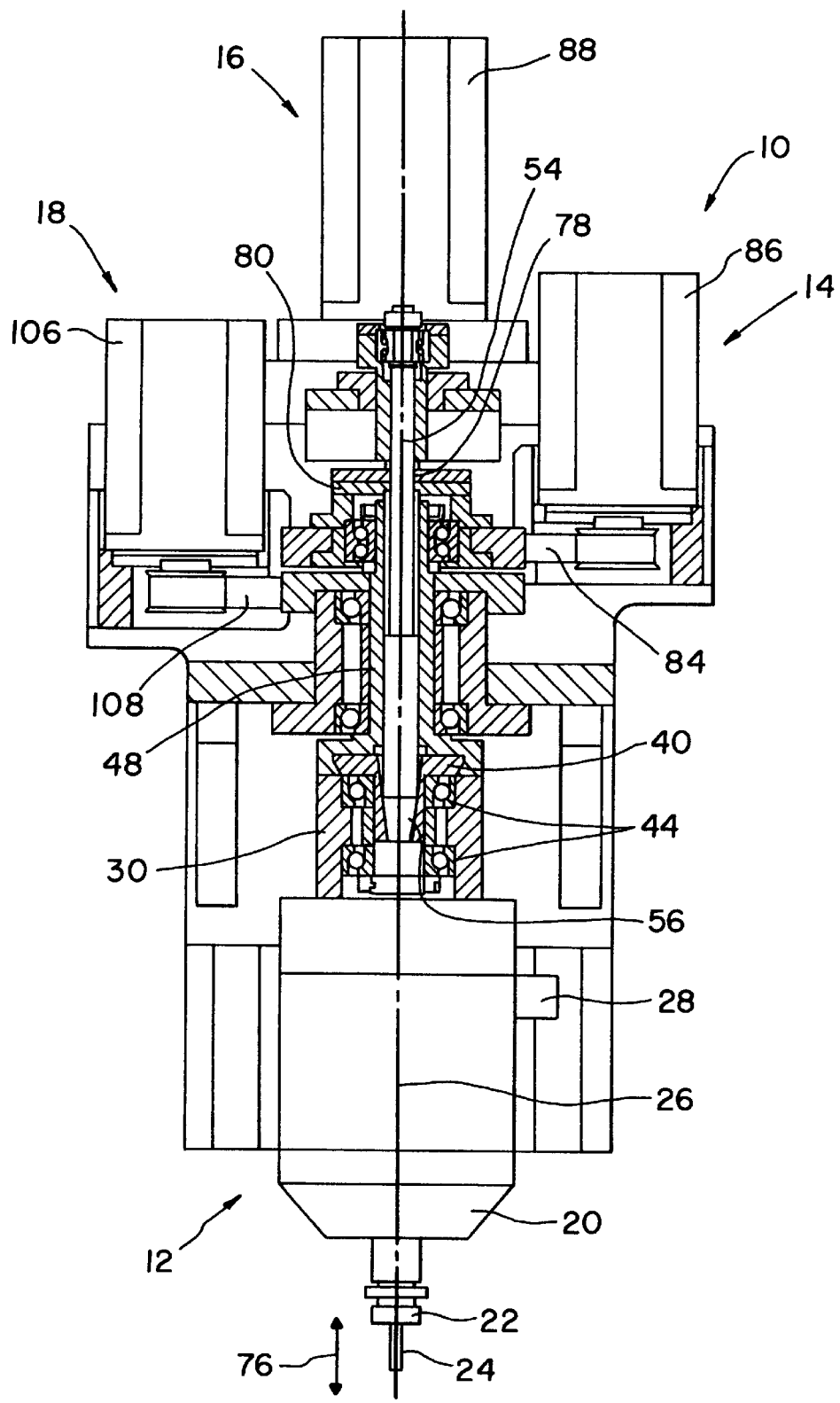
FIG. 1 is a front, partially sectional view of one embodiment of a spindle unit of the present invention.

Referring now to the drawings and particularly to FIG. 1, there is shown a spindle unit 10 including a spindle motor 12, a radial offset mechanism 14, an axial feed mechanism 16 and an eccentric rotation mechanism 18.

Spindle motor 12 includes a body 20 and a rotatable tool holder 22 configured for holding a cutting tool 24 during rotation. Cutting tool 24, which defines a tool axis 26, can be designed for producing a hole (not shown) in a work piece such that the diameter of the hole is larger than the diameter of cutting tool 24. The hole can be machined, for example, using the method disclosed in U.S. Pat. No. 5,641,252 (Eriksson, et al.). Spindle motor 12 also includes a conduit 28 through which spindle motor 12 can be supplied with electric, pneumatic or hydraulic power.

The top of spindle motor 12 is rigidly attached to an annular attachment 30 having a retaining pin 32 (FIG. 2) extending radially from the rear thereof. Retaining pin 32 is slidably held within a slot 34 in a bracket 36 of spindle unit 10. Retaining pin 32 has a limited degree of freedom to move within slot 34 in any direction substantially perpendicular to tool axis 26. Even while sliding within slot 34, however, a longitudinal axis 38 of retaining pin 32 invariably extends in a rearward direction, thereby holding fixed the orientation of spindle motor body 20 such that body 20 always faces a same direction. This holding fixed of the orientation of spindle motor body 20 facilitates the supplying of power to spindle motor 12.

Figure 3:
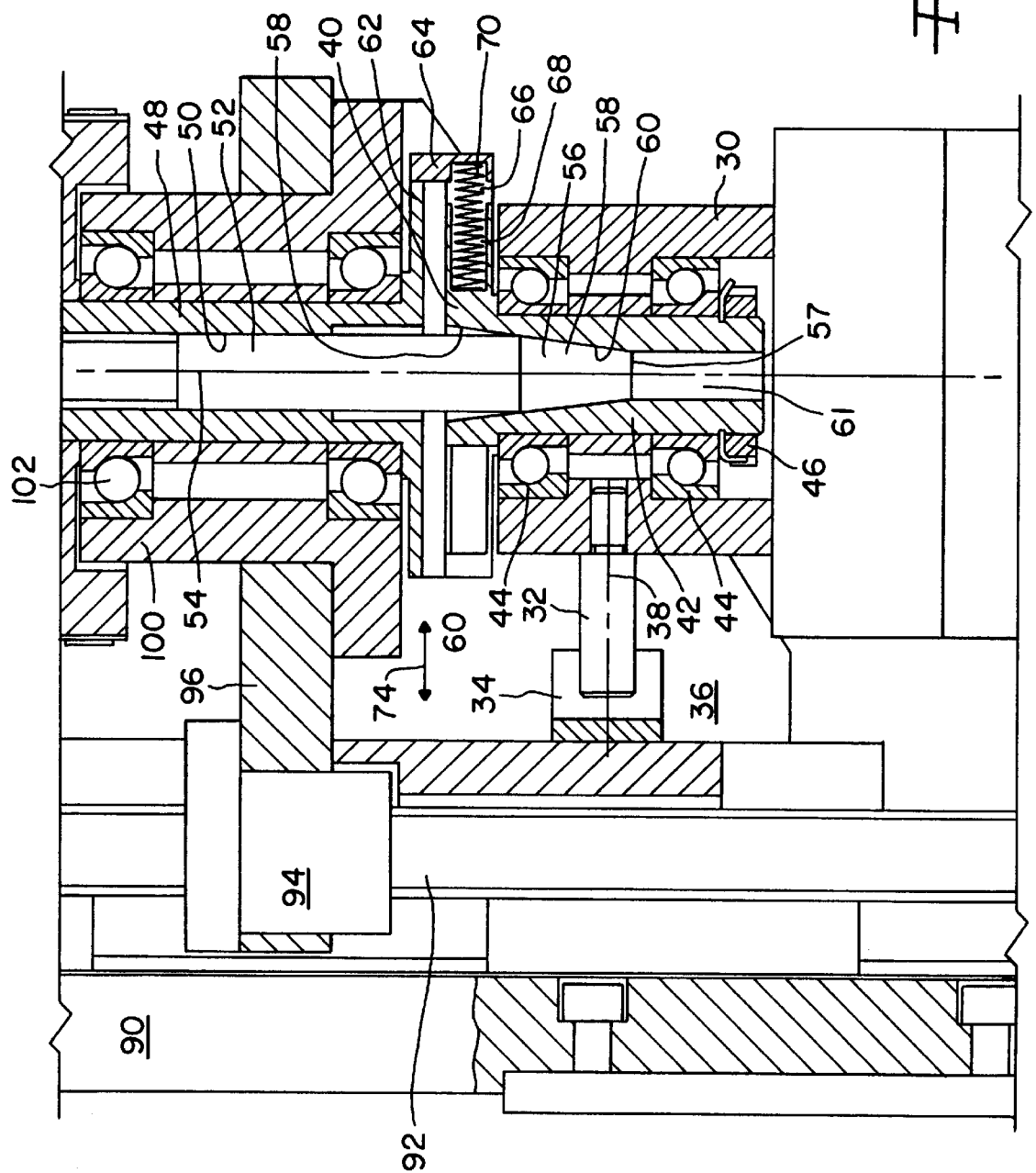
FIG. 3 is an enlarged, partial, side view of the radial offset mechanism of the spindle unit of FIG. 1, adjusted such that the tool axis and the principal axis coincide.

Radial offset mechanism 14, best seen in the enlarged view of FIG. 3, includes a sliding block 40 having an internally tapering, hollow tube 42 extending into annular attachment 30. Two annular bearings 44 are snugly disposed between and interconnect tube 42 and attachment 30, with a locking device 46 on the distal end of tube 42 holding bearings 44 in place. Bearings 44 allow tube 42 to rotate, while the rotational orientation of annular attachment 30 remains substantially fixed.

An axle 48 has a hollow interior 50 containing a radial offset needle 52 defining a principal axis 54. Radial offset needle 52 has a conically-shaped end 56 with a distal tip 57 extending into a tapered interior 58 of tube 42. End 56 is angled to match the angle of an inclined surface 60 of tapered interior 58 such that the entire length of conically-shaped end 56 can contact surface 60. Inclined inner surface 60 of sliding block 40 forms an orifice 61 with an inner diameter substantially equal to the outer diameter of distal tip 57.

Axle 48 has a radially extending portion 62 with an annular rim 64. A spring 66 is disposed in opposing holes 68 and 70 in sliding block 40 and rim 64, respectively. Spring 66 biases sliding block 40 against radial offset needle 52. More specifically, spring 66 biases surface 60 of tapered interior 58 of sliding block 40 against conically-shaped end 56 of needle 52.

Figure 2:
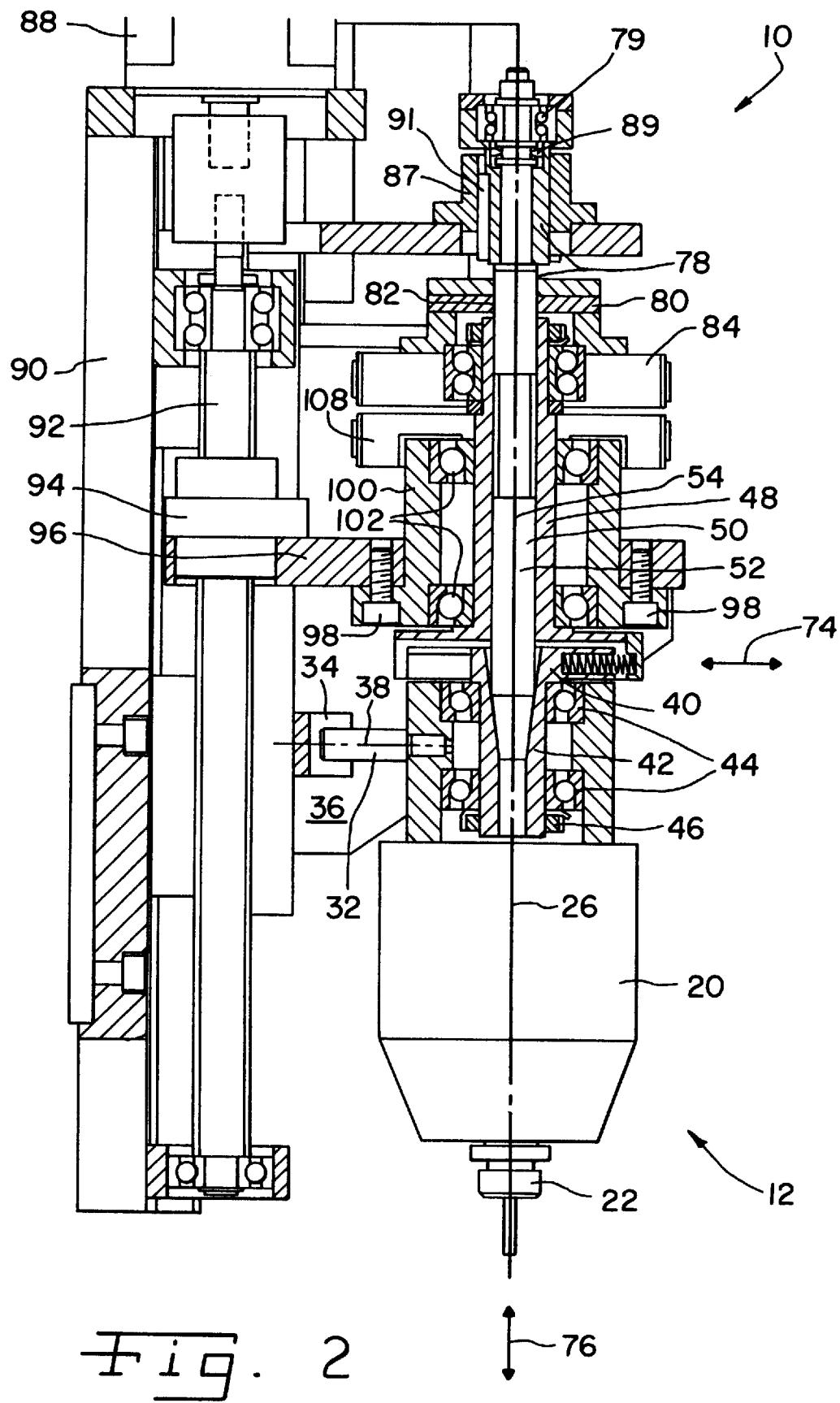
FIG. 2 is a side, partially sectional view of the spindle unit of FIG. 1, adjusted such that the tool axis and the principal axis coincide.
Figure 5:
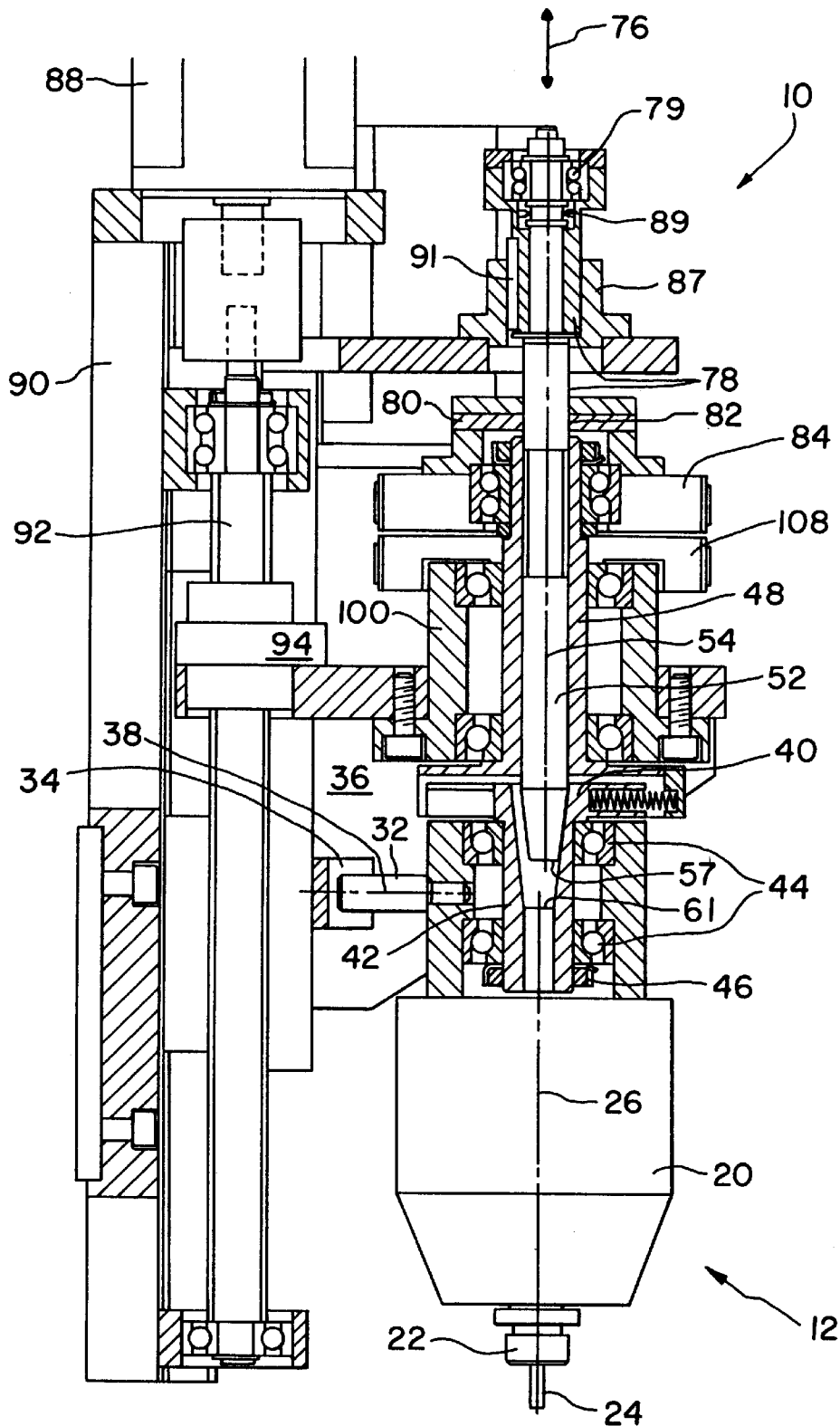
FIG. 5 is a side, partially sectional view of the spindle unit of FIG. 1, adjusted such that the tool axis is offset from the principal axis.

Radial offset needle 52 is movable in an axial feed direction indicated by double arrow 76, as is apparent by a comparison of FIGS. 2 and 5. An externally threaded sleeve 78 surrounds and is concentric with offset needle 52 such that needle 52 may rotate freely within sleeve 78, as enabled by bearings 79. An annular, disk-shaped screw 80 has an internally threaded, central hole 82 which receives and is coupled with the external threads of sleeve 78. Disk screw 80 is driven by a radial offset belt 84 which, in turn, is driven by a radial offset motor 86.

An upper portion of sleeve 78 is received in a bushing 87. Sleeve 78 is fixed in the angular direction by a wedge 91 disposed within bushing 87. A washer-type spring 89, which is compressible in the axial feed direction indicated by double arrow 76, is disposed around and connected to needle 52 immediately above bushing 87. Spring 89 has an outer diameter which is larger than the inner diameter of sleeve 78 in order to allow spring 89 to be pressed against sleeve 78 and to prevent spring 89 from being pushed into the area within sleeve 78. Within bushing 87 is sleeve 78; and within sleeve 78, in turn, is needle 52. Washer-type spring 89 is configured for resisting axial movement of needle 52 toward orifice 61 of sliding block 40 when distal tip 57 of needle 52 is within a predetermined distance of orifice 61. The predetermined distance is approximately equal to the axial distance by which spring 89 can be compressed.

Figure 4:
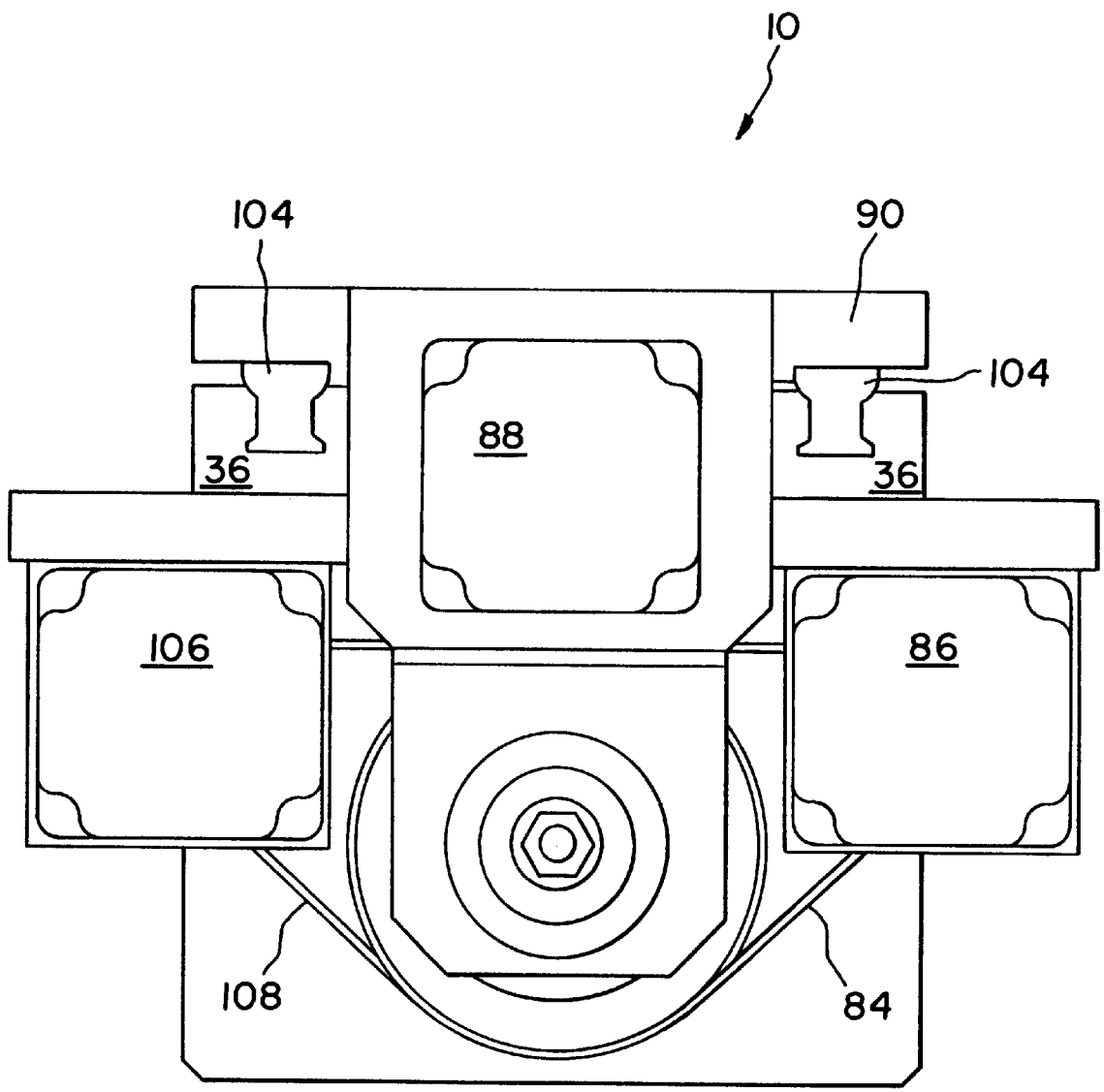
FIG. 4 is a top view of the spindle unit of FIG. 1.

Axial feed mechanism 16 includes a stationary axial feed motor 88 rigidly attached to a fixed mounting plate 90. Motor 88 rotates a threaded output shaft 92 which is received in, coupled to, and carries an internally threaded ball bearing screw 94. Ball bearing screw 94 is rigidly attached to an arm 96 of bracket 36, with bracket arm 96 being secured by screws 98 to an annular casing 100 surrounding axle 48. Bearings 102 interconnect casing 100 and axle 48, yet allow axle 48 to rotate relative to casing 100. A pair of sliding blocks 104 (FIG. 4) interconnect mounting plate 90 and bracket 36 and allow relative sliding movement therebetween.

Eccentric rotation mechanism 18 includes an eccentric rotation motor 106 which drives an eccentric rotation belt 108 engaged with axle 48. Belt 108 rotates axle 48 around principal axis 54, and thereby, due to the offset of tool axis 26 from principal axis 54 created by radial offset mechanism 14, provides a corresponding eccentric rotation of cutting tool 24 around principal axis 54.

In operation, spindle motor 12, receiving power through conduit 28, causes a rotation of tool holder 22 and a corresponding rotation of cutting tool 24. Axial feed motor 88 of axial feed mechanism 16 causes a rotation of output shaft 92, which causes ball bearing screw 94 to move up or down, depending upon the direction of rotation of output shaft 92. Ball bearing screw 94, through bracket arm 96 and the rest of bracket 36, is rigidly connected to spindle motor 12, radial offset mechanism 14 and eccentric rotation mechanism 18, along with the associated motors 86 and 106. Thus, the axial movement of ball bearing screw 94 causes a corresponding axial movement in substantially all of spindle unit 10, except for the axial feed mechanism 16 itself. The parts of axial feed mechanism 16 which are stationary relative to the axial direction include axial feed motor 88, output shaft 92 and mounting plate 90. Through the above-described operation of axial feed mechanism 18, a rotating cutting tool 24 can be advanced into a work piece (not shown) in order to machine a hole in the work piece.

Radial offset mechanism 14 can be operated in order to create a radial offset between tool axis 26 defined by cutting tool 24 and principal axis 54 defined by axle 48 and radial offset needle 52, as shown in FIG. 5. Radial offset motor 86 drives radial offset belt 84, which, in turn, rotates disk-shaped screw 80. Sleeve 78, which is threadedly received within a central hole 82 of screw 80, moves up or down in the axial direction relative to screw 80, depending upon the direction of rotation of screw 80. Sleeve 78 is axially coupled to radial offset needle 52 such that needle 52 follows any axial movement of sleeve 78. However, needle 52 is still rotatable within sleeve 78. When screw 80 is brought into rotation, sleeve 78 is moved in an axial direction. In turn, sleeve 78 transfers this movement to needle 52. Needle 52 is thus free to rotate along with the eccentric rotation. The arrangement also makes it possible to change the offset during machining, which is useful for machining of conical holes or complex-shaped axisymmetrical holes.

Sliding block 40 moves radially in response to the axial movement of radial offset needle 52. Spring 66 biases surface 60 of tapered interior 58 of sliding block 40 against the conically-shaped end 56 of needle 52. Due to the matching angles of conically-shaped end 56 and surface 60, which physically interface with each other, a movement of needle 52 away from spindle motor 12 results in a sliding movement of sliding block 40 towards mounting plate 90, as shown in FIG. 5. Sliding block 40 slides relative to axle 48 while at the same time retaining the ability to follow the rotation of axle 48. As sliding block 40 slides, it pushes annular attachment 30 and spindle motor body 20 along with it. Thus, tool axis 26 of cutting tool 24 becomes displaced or offset from principal axis 54.

As radial offset needle 52 advances toward the position shown in FIG. 2, wherein tool axis 26 and principal axis 54 coincide, conically-shaped end 56 begins to physically interface with surface 60 of tapered interior 58 around the entire 360° of its circumference. If conically-shaped end 56 is advanced too quickly into this position, there is a danger that end 56 will become wedged or jammed into tapered interior 58, which is also referred to as "clamping." When distal tip 57 of end 56 approaches orifice 61, the axial force would increase dramatically for small axial displacements if there were no elasticity in the system. Such elasticity is provided by washer spring 89. When tip 57 approaches orifice 61, washer spring 89 makes contact with and begins to become squeezed against the top of bushing 87. Spring 89 starts to contract, resisting further advances of needle 52 and its tip 57 towards orifice 61. Thus, the risk of clamping is substantially reduced.

The operation of eccentric rotation mechanism 18 causes cutting tool 24 to circularly oscillate or orbit around principal axis 54 while tool 24 simultaneously rotates about its own axis 26. The radius of the circular oscillation is substantially equal to the radial offset between tool axis 26 and principal axis 54. As sliding block 40 rotates along with axle 48, spring 66 also rotates. As the rotational position of spring 66 changes, the direction of offset of sliding block 40, and thus the offset of cutting tool 24 from principal axis 54, undergoes a corresponding change. When offset from principal axis 54, cutting tool 24 makes one full rotation around principal axis 54 for every rotation of spring 66 around principal axis 54.

Retaining pin 32 holds the orientation of attachment 30 and spindle motor body 20 fixed such that spindle motor body 20 always faces in a same, predetermined direction and cannot rotate about tool axis 26. However, bearings 44 allow sliding block 40 to freely rotate about tool axis 26, even while attachment 30 cannot. The radial offset and rotation of sliding block 40 causes attachment 30 to oscillate in a circular path about principal axis 54. Retaining pin 32 slides as necessary within slot 34 in any direction which is perpendicular to axes 26 and 54 in order to follow the oscillation of attachment 30. Retaining pin 32 always points in a same direction within slot 34, i.e., is always oriented in the same direction as shown in order to fix the orientation of spindle motor body 20.

Using the spindle unit 10, cutting tool 24 can be simultaneously fed in an axial direction, rotated about its own axis 26, and eccentrically oscillated about a principal axis 54 in order to produce holes having diameters greater than the diameter of cutting tool 24. In addition, by using radial offset mechanism 14 to adjust the radial offset of cutting tool 24 during the machining process, it is possible to produce conical holes or other types of axisymmetrical complex-shaped holes.

The interfacing contact surfaces of needle end 56 and the tapered interior 58 of sliding block 40 are shown as being conically-shaped. However, it is to be understood that the interfacing contact surfaces can be shaped other than conically. It is possible for one or both of the needle end and the interior surface of the sliding block to have a rounded shape, i.e., to following a non-linear or parabolic function of the axial position. With such a non-linear needle end or non-linear interior surface, the needle end does not contact the interior surface of the sliding block along the entire axial length of the needle end, except in the special case where the needle end and the interior of the sliding block have identical or complementary shapes and the needle is fully inserted into the sliding block. Rather, the needle contacts the interior surface of the sliding block at only one discrete point along the axial length of the needle end, with the discrete point being a function of the axial position of the distal tip of the needle. It is also possible for the rounded interior of the sliding block to be substantially wider than the rounded needle end.

Figure 6:
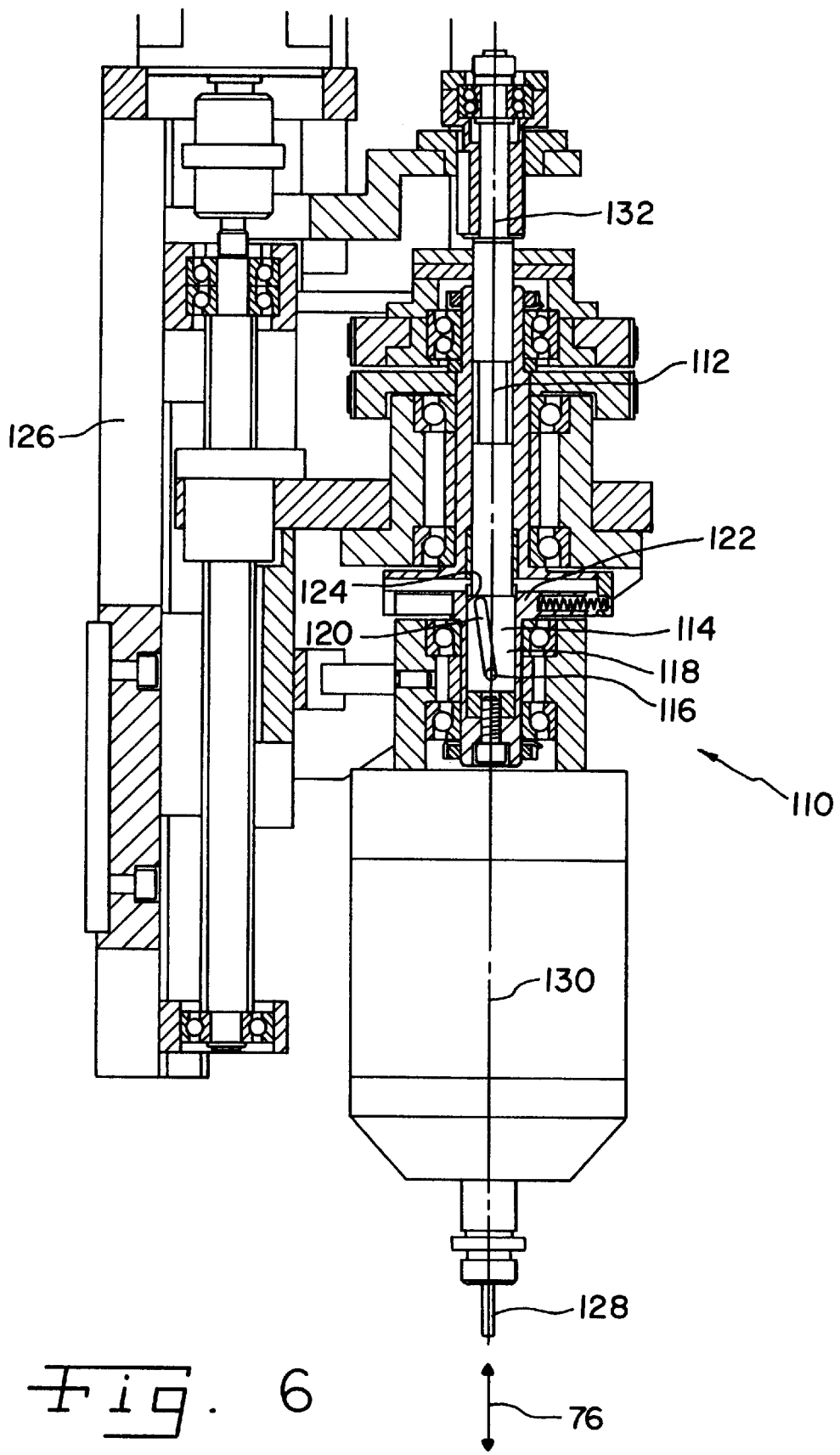
FIG. 6 is a side, partially, sectional view of another embodiment of a spindle unit, adjusted such that the tool axis and the principal axis coincide.
Figure 7:
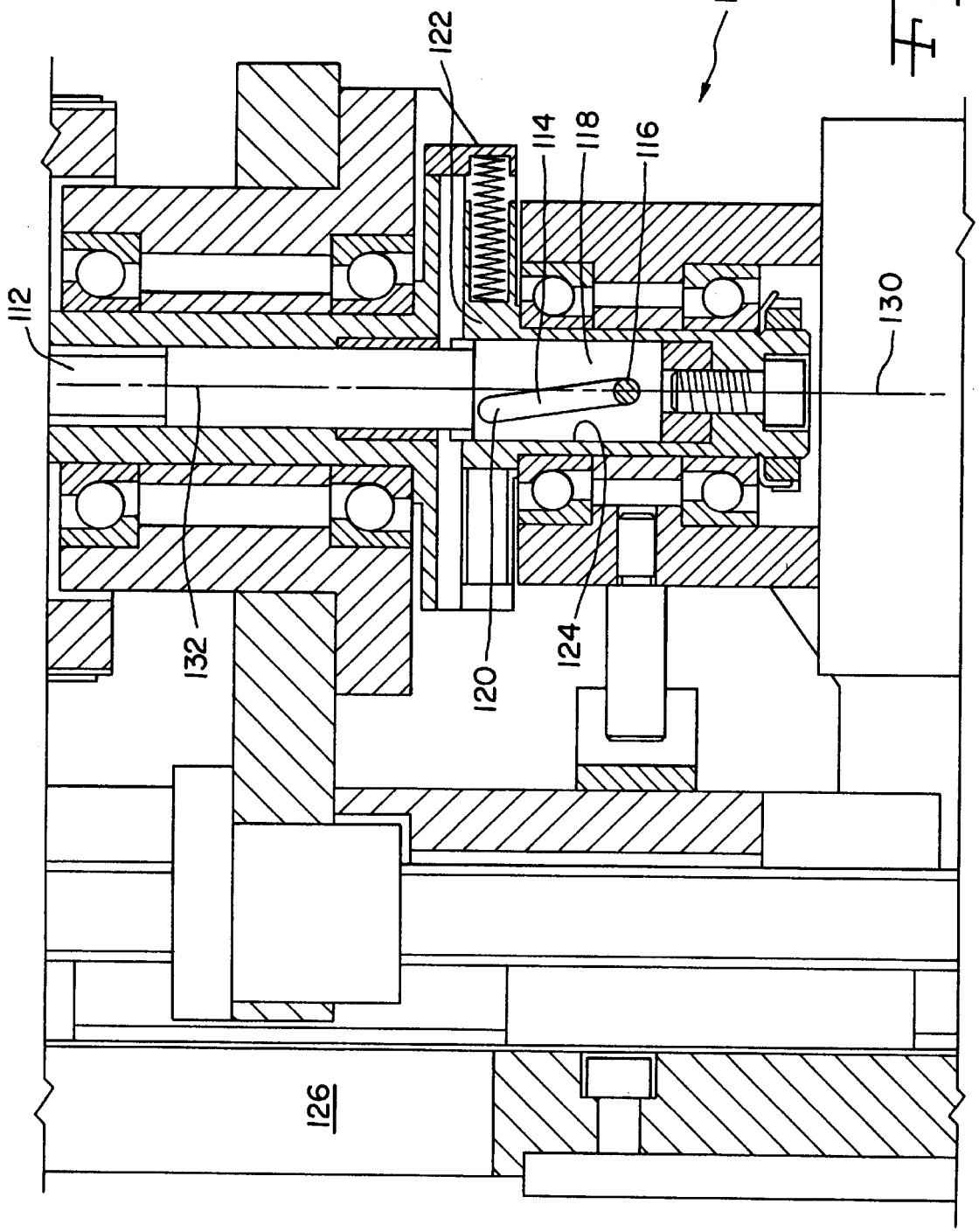
FIG. 7 is an enlarged, partial, side view of the radial offset mechanism of the spindle unit of FIG. 6, adjusted such that the tool axis and the principal axis coincide.
Figure 8:
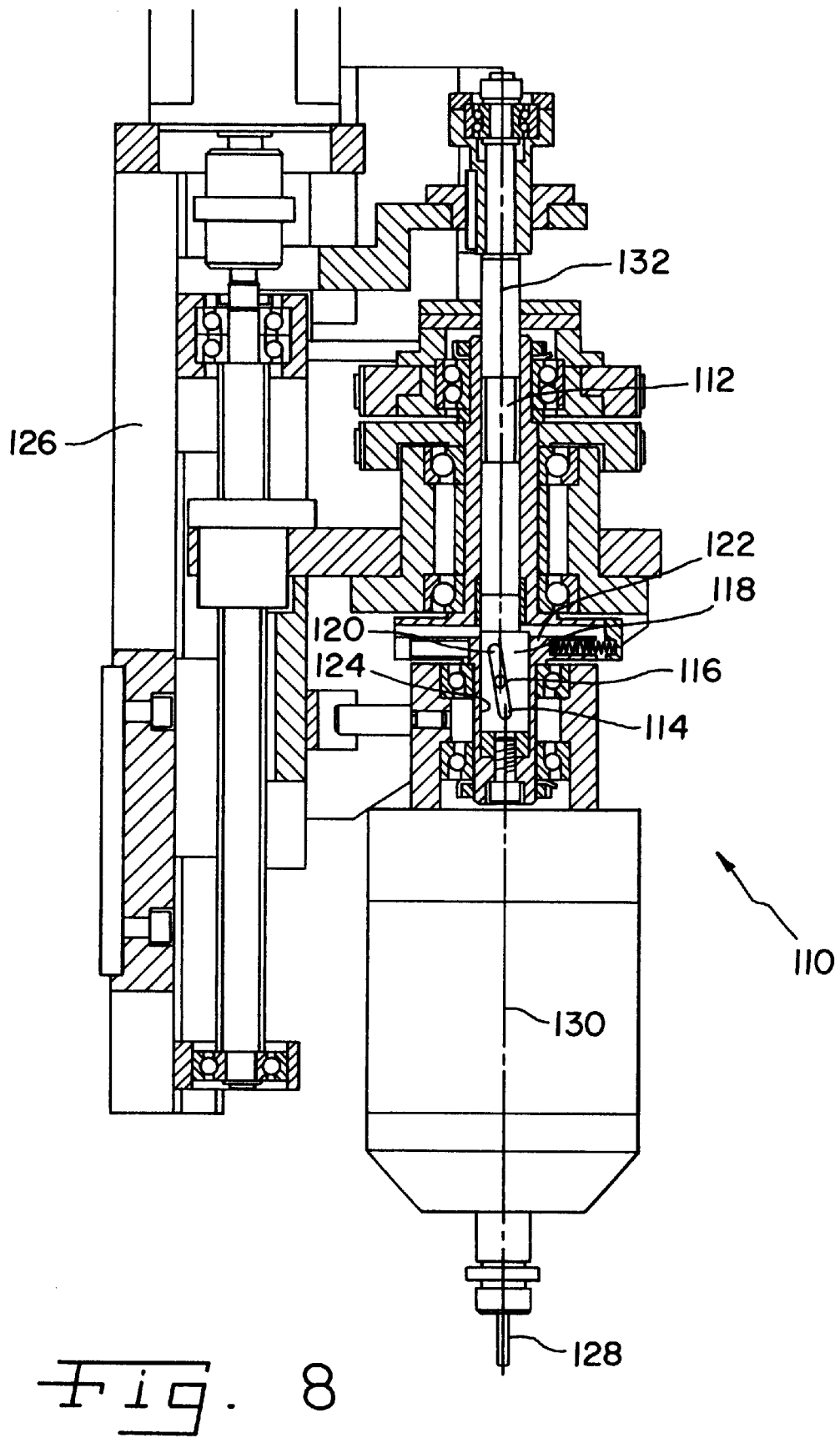
FIG. 8 is a side, partially sectional view of the spindle unit of FIG. 6, adjusted such that the tool axis is offset from the principal axis.

Another embodiment of the spindle unit is shown in FIG. 6. This embodiment is substantially the same as that in FIGS. 1–5 with the exception of a radial offset mechanism 110, best seen in the enlarged view of FIG. 7. A shaft 112 is oriented in the axial feed direction, indicated by double arrow 76, and has an end 114 with a pin 116 extending radially therefrom. End 114 of shaft 112 is received in a sleeve 118 having an inclined slot 120 retaining pin 116. Sleeve 118 is tightly held within a sliding block 122 such that sleeve 118 abuts against and interfaces with an inner surface 124 of sliding block 124. A movement of shaft 112 in the axial feed direction, as shown in FIG. 8, results in pin 116 moving along inclined slot 120, since sleeve 118 is fixed in the axial direction relative to sliding block 122. The upward movement of pin 116 shifts sleeve 118 and, in turn, sliding block 124 away from mounting plate 126, thereby radially displacing cutting tool 128 and its axis 130 from principal axis 132. Sleeve 118, pin 116 and inclined slot 120 rotate around with sliding block 122 in order to rotate the direction of offset around principal axis 132, thereby orbiting cutting tool 128 around principal axis 132.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for using a cutting tool with a first width and a tool axis to machine a hole in a work piece, the hole having a second width at least as large as the first width of the cutting tool, said apparatus comprising:

a first actuator configured for continuously rotating the cutting tool about its tool axis during the machining of the hole;

a second actuator configured for moving the cutting tool in an axial feed direction substantially parallel to the tool axis of the cutting tool, said second actuator being simultaneously operable with said first actuator;

a third actuator configured for rotating the cutting tool about a principal axis, said principal axis being substantially parallel to the tool axis of the cutting tool, said third actuator being simultaneously operable with said first actuator and said second actuator to thereby machine the hole; and a radial offset mechanism configured for adjusting a radial distance of the tool axis of the cutting tool from said principal axis.

2. An apparatus for using a cutting tool with a first width and a tool axis to machine a hole in a work piece, the hole having a second width at least as large as the first width of the cutting tool, said apparatus comprising:

a first actuator including a spindle motor configured for carrying the cutting tool and for rotating the cutting tool about its tool axis;

a second actuator configured for moving the cutting tool in an axial feed direction substantially parallel to the tool axis of the cutting tool, said second actuator being simultaneously operable with said first actuator;

a third actuator configured for rotating the cutting tool about a principal axis, said principal axis being substantially parallel to the tool axis of the cutting tool, said third actuator being simultaneously operable with said first actuator and said second actuator to thereby machine the hole; and a radial offset mechanism configured for adjusting a radial distance of the tool axis of the cutting tool from said principal axis.

3. The apparatus of claim 2, wherein said spindle motor is connected to an internally threaded ball bearing screw carried by an externally threaded axial drive shaft, said second actuator including an axial feed motor configured for rotating said axial drive shaft relative to said ball bearing screw, thereby moving said ball bearing screw and said spindle motor in said axial feed direction.

4. The apparatus of claim 2, wherein said spindle motor includes a body configured for carrying the cutting tool, said third actuator including an eccentric rotation motor driving an eccentric rotation belt, said eccentric rotation belt being coupled to said body of said spindle motor such that rotation of said eccentric rotation belt results in a corresponding eccentric rotation of said spindle motor about said principal axis.

5. The apparatus of claim 2, wherein said radial offset mechanism includes a radial offset motor driving a radial offset belt, said radial offset belt rotating an internally threaded disk-shaped screw around a threaded sleeve, thereby moving said threaded sleeve in said axial feed direction.

6. The apparatus of claim 5, wherein said threaded sleeve is coupled to a tool holder configured for holding the cutting tool such that said movement of said threaded sleeve in said axial direction results in a movement of said tool holder in a radial direction.

7. An apparatus for machining a hole in a work piece, comprising:

a spindle motor rotatable about a principal axis, said spindle motor including a tool holder having a tool axis substantially parallel to said principal axis, said tool holder being rotatable about said tool axis;

an axial actuator configured for moving said spindle motor in an axial feed direction substantially parallel to each of said principal axis and said tool axis; and a radial actuator configured for adjusting a radial distance between said principal axis and said tool axis.

8. The apparatus of claim 7, wherein said tool holder is eccentrically rotatable about said principal axis.

9. The apparatus of claim 7, wherein said radial actuator includes a sliding block coupled to said tool holder, said sliding block being slidable in a radial direction relative to said principal axis.

10. The apparatus of claim 9, wherein said radial actuator includes an offset spring biasing said sliding block in said radial direction.

11. The apparatus of claim 10, wherein said sliding block includes an inclined inner surface, said radial actuator also including a needle oriented in said axial feed direction and having a conically-shaped end, said conically-shaped end interfacing with said inclined inner surface of said sliding block such that a movement of said needle in said axial feed direction results in a corresponding radial movement of said sliding block.

12. The apparatus of claim 11, wherein said conically-shaped end includes a distal tip having an outer diameter, said inclined inner surface of said sliding block forming an orifice with an inner diameter, said inner diameter of said orifice being substantially equal to said outer diameter of said distal tip.

13. The apparatus of claim 12, wherein said radial actuator includes a washer-type spring connected to said needle, said washer-type spring being configured for resisting axial movement of said needle toward said orifice of said sliding block when said distal tip of said needle is within a predetermined distance of said orifice.

14. The apparatus of claim 10, wherein said sliding block includes an inner surface, said radial actuator also including a needle oriented in said axial feed direction and having an end interfacing with said inner surface of said sliding block such that a movement of said needle in said axial feed direction results in a corresponding radial movement of said sliding block.

15. The apparatus of claim 10, wherein said sliding block includes an inner surface, said radial actuator also including a shaft oriented in said axial feed direction and having an end with a pin extending radially therefrom, said end of said shaft being received in a sleeve having an inclined slot retaining said pin, said sleeve interfacing with said inner surface of said sliding block such that a movement of said shaft in said axial feed direction results in a corresponding radial movement of said sleeve and said sliding block.

16. A method of using a cutting tool with a first width and a tool axis to machine a hole in a work piece, the work piece having a surface, the hole having a second width at least as large as the first width of the cutting tool, said method comprising the steps of:

rotating the cutting tool about its tool axis such that the tool axis of the cutting tool is substantially perpendicular to the surface of the work piece;

moving the cutting tool in an axial feed direction substantially perpendicular to the surface of the work piece, said moving step being performed substantially simultaneously with said step of rotating the cutting tool about its tool axis;

rotating the cutting tool about a principal axis, said principal axis being substantially parallel to the tool axis of the cutting tool, said step of rotating the cutting tool about a principal axis being performed substantially simultaneously with said step of rotating the cutting tool about its tool axis and with said step of moving the cutting tool in an axial feed direction, thereby machining the hole; and adjusting a radial distance of the tool axis of the cutting tool from said principal axis, said adjusting being performed with a radial offset mechanism.

* * * * *